Feb. 24, 1953 C. FUMAGALLI 2,629,450
WIND MOTOR WITH RADIALLY PIVOTED BLADES
Filed Dec. 16, 1946 2 SHEETS—SHEET 2
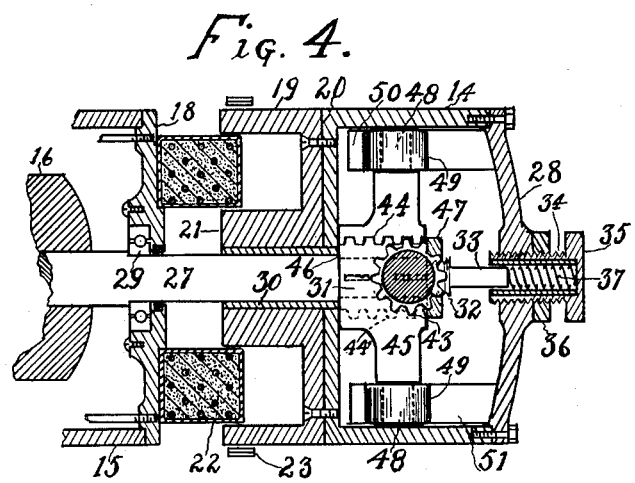
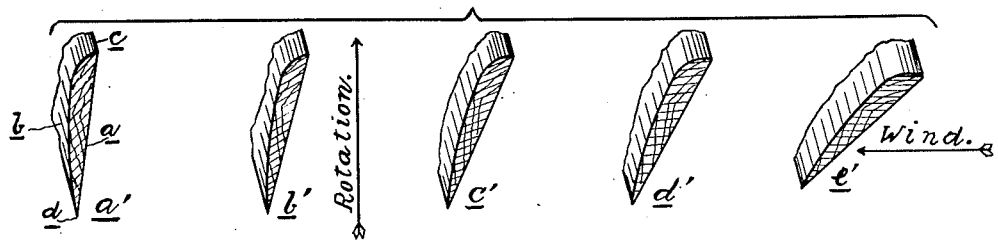
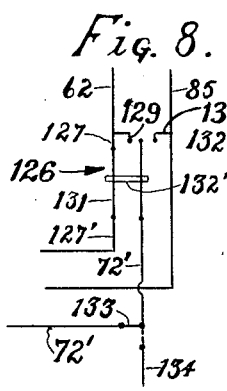 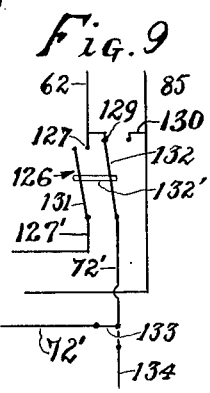 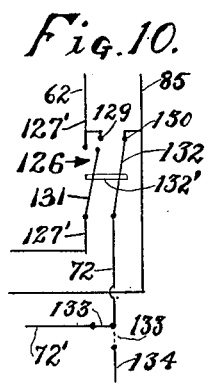
INVENTOR:
Charles Fumagalli,
By C. C. Hiner,
atty.

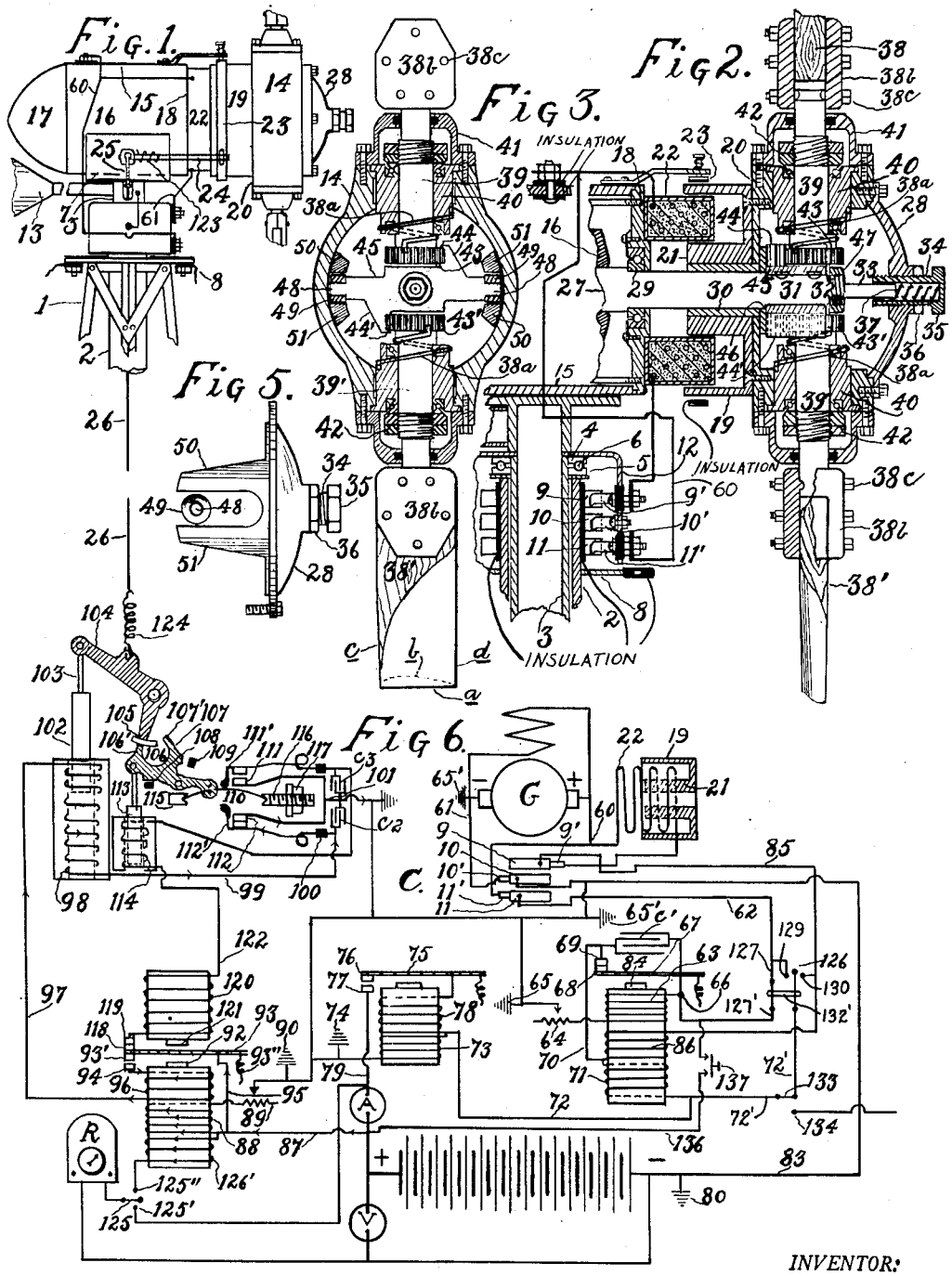

Patented Feb. 24, 1953

2,629,450

UNITED STATES PATENT OFFICE 2,629,450

WIND MOTOR WITH RADIALLY PIVOTED BLADES

Charles Fumagalli, Guatemala City, Guatemala

Application December 16, 1946, Serial No. 716,588

13 Claims. (Cl. 170—62)

This invention relates to transmissions for windmill driven electric generating and storage systems of the general type disclosed in my Patent No. 2,547,636, dated April 3, 1951, wherein a high speed propeller is employed for driving an electric generator through a transmission gearing operative as a mechanical controller governed by varying wind pressures and generator torque and by conditions in an electric supply and storage system charged by the generator to automatically change the propeller pitch and regulate the speed of the propeller to secure safe operation of the windmill and to vary the charging rate of the generator as necessary to meet battery requirements or other conditions in the electric circuits.

The present invention is preferably designed and adapted for use in connection with the type of apparatus disclosed in my aforesaid Patent No. 2,547,636, relating to a prime-mover dynamo plant employing a windwheel to drive a generator to charge an electric supply and storage circuit, and in which the electric supply and storage circuit includes electrical controlling means coacting with a transmission controller to govern the action of the propeller, but the present invention is not necessarily limited thereto and may be used in connection with any type of circuit adapted for cooperation therewith.

In my aforesaid Patent No. 2,547,636 there is disclosed a rocker bar and crank link type of transmission-controller for adjusting the propeller for safe running regardless of wind velocities to supply high power for a starting action, and to thereafter drive the generator at a charging rate to meet circuit conditions, as fully set forth in said patent. The present application is designed to provide a windmill generator operating in the same general manner and giving the same substantial advantages but which employs a rack and pinion or equivalent gear type of transmission-controller between the propeller and generator adapted to efficiently transmit driving motion to the generator and operative at different wind pressures and in association with coacting controlling means to govern the action of the propeller. The claims of the present application are directed to a propeller per se employing transmission means of the character described and to electro-mechanical or solenoid means cooperating therewith to govern the action of the propeller.

In the accompanying drawings, in which I have shown the present invention in connection with a windmill and electric circuit of the general character disclosed in my said Patent No. 2,547,636, Fig. 1 is a view in side elevation of a portion of a windmill tower and of a windmill head embodying the invention.

Fig. 2 is a vertical longitudinal section through a portion of the windmill head showing the propeller blades in intial position, as when the windmill is out of action.

Fig. 3 is a vertical transverse section through the gear casing of the windmill head on the line of the shafts of the propeller blades.

Fig. 4 is a horizontal transverse section through the gear casing.

Fig. 5 is a view in side elevation of the detachable part of the head of the gear casing and the guide rails carried thereby.

Fig. 6 is a diagram of the electric circuit.

Fig. 7 is a view exemplificatively showing the starting position of a propeller blade and its variable running positions under increasing wind pressures.

Figs. 8, 9 and 10 are views of the double throw controlling switch, showing different positions thereof.

Referring now more particularly to the drawings, I designates a windmill frame or tower carrying an outer stationary shaft 2 and an inner shaft 3 rotatable therein, said shafts having fixed thereto turntable members 4 and 5 between which are interposed antifriction bearings 6, and on which shaft 3 the windmill head 7 is mounted so as to be rotatably movable to maintain itself normally in the path of the wind. As shown, the shaft 2 or tower I carries a junction plate 8, and mounted on said shaft 2 is a set of collector rings 9, 10 and 11 engaged by brushes 9', 10' and 11' mounted on an inverted cup-shaped member 12 fixed to and rotatable with the shaft 3, said member forming with the plate 8 a casing or enclosure for the rings and brushes and a support for their binding posts and associated electrical connections. A tail vane 13 is suitably mounted on the shaft 3 or head 7 and acts as a surface to normally keep the head facing toward the wind.

The windmill head is in the form of a more or less streamlined body or casing comprising a movable front casing section 14, a stationary casing section 15 enclosing the generator 16 having a conoidal rear end portion or cap 17, a closure head or partition 18 at the forward end of the section 15, and a telescopic coupling connection between the sections 14 and 15, said telescopic connection consisting of a cup-shaped armature member 19 secured to the rear wall 20 of the section 14, and having a hub or sleeve portion 21 forming a solenoid core, and an annular solenoid coil 22 secured to the head 18 and telescopically enclosing the core 21 and telescopically fitting within the member 19. Member 19 is preferably formed with the core as a unit and both made of magnetic metal so that members 19 and 21 act as a solenoid armature and so that the attractive force of the coil on the members 19 and core 21 may be utilized to the fullest advantage to pull or draw the parts 14 and 19 rearward or toward casing section 15 when the coil is energized. The member 19 also serves as a brake drum externally engageable by a spring retracted split brake band 23 supported by the casing section 15, the ends of which band are coupled to a rock shaft 24 actuable by a lever 25 to contract and apply the band. The lever 25 is connected by a cable 26 to an electric controller in a charging and storage circuit C so as to operate to apply the brakes at a time and in the manner hereinafter described.

The forward or head casing section 14 forms the head and an enclosure for the forward portion of the generator drive shaft 27 and parts of the transmission, propeller and mechanical propeller adjusting or control means. As shown, the casing 14 comprises an annular casing body closed at the rear by the wall 20 and at the front by a detachable cover 28. The shaft 27, which forms part of or is coupled at its rear end to the generator armature, extends into the casing 14 through an anti-friction bearing 29 on the head 18 and a bearing bushing 30 fitted in the armature 21 and wall 20 and is provided within the casing 14 with a reduced portion 31 having a threaded surface 32 and a reduced terminal or tip 33. The tip 33 extends into the chamber of a hollow regulating screw 34 fitted in a threaded opening at the center of the cover 28 and having at its outer end an adjusting head 35 and carrying a jamb nut 36, whereby it may be adjusted and fixed in adjusted position. In said screw is arranged a spring 37 against which the tip 33 bears. This spring operates to maintain the casing 14 in a predetermined forward position and to provide a yielding resistance to rearward sliding movement of said casing. This resistance may be varied by adjustment of the screw 34, which serves with the spring as a controller whereby the degree of adjustment of the propeller and its allowable maximum and minimum speeds may be set or regulated as occasion may require.

The propeller per se and the transmission and propeller adjusting means comprises a pair or more of diametrically disposed propeller blades 38, 38' secured by clamping members 38b and bolts 38c to shafts 39, 39' journaled at opposite sides of the casing 14 in anti-friction bearings arranged in bearing sleeves 40 secured in place by brackets 41 and adjustable to take up wear by adjusting nuts 42. The blades are adjustable about their axes to increase their pitch for wind speed increasing actions against the resistance of adjusting spring 37, which acts in conjunction with spirally coiled springs 38a to bring them back to initial position. Springs 38a, as shown, are disposed about the sleeves 40 and shafts 39, 39' and are terminally engaged with the sleeves and with the shafts or with the gears 43, 43' fixed to the respective shafts.

At their inner ends the shafts 39, 39' are provided with spur gears or pinions 43, 43' of full circular or segmental form, which mesh with rack bars 44, 44' carried by a transversely arranged transmission bar or lever 45 keyed to part 31 of shaft 27 between a shoulder 46 on the shaft and a retaining nut 47 applied to the threaded surface 32. The oppositely extending arms of the bar 45 are provided with spindles 48 on which are journaled rollers 49 arranged to travel between spaced sets or pairs of guide and driving rails 50 and 51 extending inwardly from the head 28, whereby the shaft 27 is coupled to the head 14 to rotate therewith and whereby the head 14 is fitted to slide inwardly and outwardly on and relative to the shaft 27. Motion of the head 14 inwardly or rearwardly under wind pressures is yieldingly resisted by the spring 37, while the springs 38a resist in a calibrated manner the axial rotation of the gears and act to take up all slack caused by the clearance or wear between the gears and racks and to equalize the axial position of the blades; also the springs 38a when tensioned coact with the tensioned spring 37 to move the blades from adjusted positions back to normal position. The normal position of the hub on the shaft is outward or against the direction of the wind and the normal axial position of the blades is set by the gears at a high-tip-speed-ratio in which said blades start into rotation and run until they reach the high top speed allowed by the adjusted spring 37, which holds the hub from sliding inwardly on the shaft until the wind reaches such a speed and pressure sufficient to overcome the tension of the spring 37 whereupon the hub will be forced to slide inwardly a greater or less distance dependent on the wind force, thereby compressing the spring and increasing its tension to the point where the spring tension is equal to the wind pressure. The hub in such inward sliding movements, causes adjustment of the blades to axial positions in which the wind speed and spring pressures acting on the blades are automatically regulated to maintain the top running speed set by adjustment of the top speed regulating screw or bolt 34. Any increasing wind pressure causes a further sliding movement of the hub and proportional axial shift of the blades to a lower-tip-speed-ratio to exactly and automatically maintain the same propeller top speed efficiency, and any relatively decreasing wind pressure allows the spring 37 to slide the hub forward in a counter-wind direction. Also the movement of the hub in a counterwind direction causes the blades to suction wind by their speed inertia and exaggerated pitch, out of proportion to the lower speed of the wind, permitting the hub to be quickly shifted forwardly and to shift the blades for a higher-tip-speed-ratio-efficiency proportionately to the decreasing speed of the wind so as to obtain exactly the same top propeller speed R. P. M. By the explained governing action of my transmission it will be evident that the propeller never overspeeds regardless of the wind velocities, as by the decreasing tip-speed-ratio range of the blades the tip-speed-ratio-efficiency may be decreased to the limit at which the propeller no longer acts as a motor.

Another notable advantage of the transmission is that the top running speed of the propeller may be varied to a great range by adjusting the yielding spring 37 by means of the bolt 34, so that any top generator charging rate may be obtained, allowing any small or large battery to be charged by the windmill generator to meet exactly the capacity requirements of the battery without damage.

The combined transmission and mechanical controller above described is also adapted to be electrically controlled by the solenoid 19—22 through means in the circuit C, and governed by conditions in said circuit, to adjust the propeller and regulate the generator charging rate, or to stop the windmill, as will be fully set forth in the subjoined description.

Each propeller blade 38, 38' is or may be of standard helical type commonly used in windmill electric generators and having a suitable pitch, which may be, for example, from 8° to 12° at the hub. The blades are adjustably secured to their shafts by brackets 38b and bolts 38c whereby they may be adjusted to a desired fixed starting angle. Each blade has a front face $a$, a rear airfoil face $b$, a leading edge $c$ and trailing edge $d$ and is sectionally shaped to give it the determined inherent pitch and airfoil shape. Each blade, though having a fixed starting and running angle position in which it is secured by brackets 38b and bolts 38c, is adjustable about its axis to vary its starting and running angle through the action of the wind pressure and the yielding tension of the spring 37. The head or hub 14 rotates about the shaft 27 and is coupled thereto by the lever 45 and rails 50, 51, so that in the rotation of the hub the shaft will be driven at a governed speed regulated by the pressure of the wind and the adjustments of the propeller blades. Figs. 2, 3 and 4 and blade-position $a'$ of Fig. 7 show the starting and running position of the propeller and transmission and starting and running position $a'$ of the blade at the fixed starting and running angle, which may be varied by the wind pressure, and the yielding adjustment of the tensioned spring 37 by the regulator screw 34. The adjustments of the hub 14 and propeller blades 38, 38' also determine the governing positions of the blades and the allowable maximum speeds of the propeller, which may be set according to general wind speeds and to the ampere hour capacity of the battery and the requirement of the circuit or load applied to the generator. When the windmill is in operation the speed of the propeller and the charging rate of the generator are automatically governed by the adjustment of the blades through the backward and forward sliding movements of the head 14 under wind high pressures, the action of the spring 37, and the action of the rack and pinion gears, 43, 43', 44, 44', whereby the speed of the propeller or its effective power transmitted, and the generator charge rate and load, are automatically controlled by mechanical means, i. e., the sliding hub and the rack and pinion, generator driving and blade adjusting gearing.

Fig. 7 shows in connection with Figs. 2, 3 and 4 the starting and running position of the blades and their governing positions at different high wind speeds in which the blades are adjusted to compensate for different wind speeds or pressures in order to maintain a safe and constant windmill speed. At $a'$ in Fig. 7 is shown the starting and running position of the blades at the fixed or adjusted starting angle, to give a powerful starting and efficient running angle. At $b'$, $c'$, $d'$, $e'$, in Fig. 7, are shown the positions to which the blades are successively shifted for governing actions at progressively increasing wind speeds up to high or strong wind velocities of any degree, and at which the blade angles are adjusted to reduce their efficiency proportionate to the speed of the wind, whereby the propeller speed is controlled so that the propeller and generator will be operated at a safe and constant speed at governing speeds regardless of wind velocities. From position $a'$, giving a powerful starting and running action, the blades are shifted to positions $b'$ to $e'$ or more by rearward sliding movements of the head under wind pressures against the resistance of the spring 37, which, by reaction, as the wind speeds are reduced, move the head forward to reverse the order of adjustment of the blades to the higher tip-speed-ratio positions. The adjustments of the blades in one direction or the other, dependent upon wind pressures, increases or reduces the effective tip speed ratio of the propeller to regulate the speed within given limits. Normally, the parts pass smoothly from the starting and running position shown in Figs. 2, 3, 4, 7 ($a'$) to the governing positions, in which running position $a'$ the propeller will turn at a variable R. P. M. calculated to operate the generator at an adjusted charging rate, varying more or less from the wind speed required to start the propeller to more or less high wind speeds for any top speed of the propeller to get any required charging rate output of the generator to charge the battery according to its capacity and the circuit demands in accordance with the rate determined by the adjustment of spring 37 by the screw 34. The propeller blades maintain the running position $a'$ until the propeller reaches the determined top speed at required wind speeds. From this point on, higher pressures of the wind on the propeller causing rearward sliding movements of the propeller head will cause mechanical shifting of the blades to lower-tip-speed-ratio at, say, wind pressures of, for example, from 20 to 80 or any speed M. P. H., to the lower-speed-ratio-angle positions shown and indicated at $b'$, $c'$, $d'$, $e'$ in Figure 7 or further increased lower-tip-speed-ratio positions up to an entirely ineffective angular position, decreasing the speed and efficiency of the propeller to compensate for the speed of the wind, but maintaining the predetermined adjusted windmill speed (say, 20 M. P. H., windmill speed R. P. M.) to drive the generator at a more or less constant charging output rate. The action of the windmill will be mechanically controlled in this manner through the control means so far described until conditions in the battery and electric circuit require a change in the charging rate or a stoppage of the apparatus, when the apparatus will then also be electrically controlled.

It will be understood, of course, that the top speed limit adjustment of the propeller may be regulated by means of the regulating screw 34, and that, beginning with angle $a'$ shown in Figure 7, or an approximate angle, and continuing throughout the lower-tip-speed-gear-ratios shown at $b'$ to $e'$ in Figure 7, the speed will be governed by the tip-speed-gear-ratio arrangement of the blades whereby the speed of the propeller is progressively decreased as and proportionally to increasing wind speeds by means of which the effective speed-force of the wind on the propeller is progressively reduced throughout progressive high wind speed pressures. The solenoid 22—21 acts under certain conditions to slide the propeller head rearwardly to counteract the tension of the top speed regulator spring 37 of the regulator screw 34 to assist in shifting the blades to reduce the R. P. M. of the propeller coacting at any determined speed of the wind to reduce the rate of charge of the generator, as required by conditions in the battery or electric circuit C supplied with current by the generator. As the expansion of spring 37 is reduced i. e., as said spring is compressed, by the wind pressure independently of as well as conjointly with the magnetic power pull of the solenoid 21, 22, the top speed of the propeller is reduced to a lower R. P. M. so that the generator charge rate is lowered in proportion to the speed of the slowed propeller. In other words, the allowable top speed of the propeller under high wind pressure is automatically maintained at a predetermined R. P. M. by the mechanical controlling means under normal running conditions and until conditions in the circuit C require a reduced charging rate, when the solenoid is energized by the current to reduce the top speed of the propeller and the top charging output of the generator.

Electrical controlling means are provided for cooperation with the mechanical controlling means to reduce the charging rate of the generator or to stop the windmill when conditions in the circuit C require either of these actions. The plus and minus poles of the generator are connected by conductors 60 and 61, respectively, to the collector rings 11 and 10 through the brushes 11' and 10', and one end of the coil 22 is connected to the conductor 60 and the other end thereof to the collector ring 9 by means of brush 9'. The collector rings are connected through their brushes with the parts of the circuit C and the battery and associated parts and controllers therein in the manner which will now be set forth in connection with the operation of the parts normally and under other conditions in the charging action and the circuit.

The current from the generator G flows through positive conductor 60 through brush 11', collector ring 11 conductor 62, voltage coil 63, adjustable resistance 64 to ground 65 and back to negative ground 65' of the generator. The same current splits and also flows at point 66 via contact points 68, 69, conductor 70, coil 71 and conductor 72 to and through cut-out relay voltage or closing coil 73 and to ground 74, back to generator negative ground 65', attracting cut-out armature 75 and closing the current relay contact points 76 and 77, so that amperage flows from the positive of the generator through brush 11' collector ring 11, conductor 62, armature 67, contact points 68 and 69, conductor 70, heavy coil 71, conductor 72, relay heavy coil 78, armature 75, contacts 76 and 77 through conductor 79, ammeter A, to the battery positive and through its elements to battery negative ground 80 and back to generator ground 65' or through main negative conductor 83 back to the generator G. As during the charging process the voltage of the battery and circuit gradually increases, the coil 63 develops a higher magnetic attractive force on its electromagnet core 84, and also an amperage of certain high value in passing through the amperage coil 71 increases the magnetic force exerted on said core 84 to a high degree but not sufficient to attract the magnetic armature 67. As, however, the voltage in the battery circuit is constantly increasing, and as, when the battery is charged to a certain high state, a continued high charging rate may cause damage to said battery, the charging rate should be reduced. During this action the magnetic attractive force of coil 63 is increased until a greater intensity is reached, but, as a high amperage is energizing the heavy current coil 71, it coacts with voltage coil 63 to energize the core 84 to such a magnetic force as to attract the armature 67, breaking the electrical contact at points 68 and 69. The condenser c' is connected in parallel to the contacts 68 and 69 of the compound regulator formed by the coils 63, 71, core 84 and associated parts so as to prevent sparking when said contacts break the circuit.

When the contact is broken at points 68 and 69, current can no longer pass to coil 71 by means of this compound regulator circuit to the battery, on account of the open circuit caused by the separation of contact points 68 and 69, but instantly the generator voltage is increased which energizes coil 63 to a higher degree whereby the armature 67 is held attracted, keeping contacts 68 and 69 separated, which maintain a broken circuit to the path of the current supplied thereto by the generator. At this time, however, current flows through coil 22, collector ring 9 and wire 85 to regulator coil 86, which is connected to coil 71, so that both coils 86 and 71 are connected and the amperage turns are increased to hold the armature 67 in its open circuit position at a lower amperage when the generator is operating at low speed, the current thence flowing by way of the conductor 72 and associated means to the battery and back to the generator negative to continue the battery charging process at a lowered charging rate. The voltage at coil 63 diminishes to a certain degree on the flow of current by way of the coil 22 and above described course of travel of the current to the battery, but as the coil 22 is energized it attracts its core and the propeller head which slide back on the drive shaft 21 causing the propeller to change its pitch, lowering the speed and the charging rate of the generator regardless of the speed of the wind, so that the propeller will never over speed. When the propeller reaches its reduced top electrically and mechanically governed speed, if the wind diminishes below that required to drive the propeller to maintain its top medium speed, the generator charging rate is momentarily reduced, reducing the attractive force of coil 22, allowing the top speed adjusting spring 37 to force the propeller head forward, in cooperation with the suction created by the propeller owing to its excessive pitch, thus shifting the propeller blades to a pitch proportionate to the speed of the wind in order to maintain a lowered but constant propeller speed and low charging rate.

If the wind speed lowers to the point at which the propeller can no longer maintain its medium speed, and as the generator thereupon lowers its charging rate, the magnetic pull of coil 22, and that of coils 63 and 86 on armature 67 is reduced and the armature closes contacts 68, 69, and the flow of current to the coil 22 is correspondingly reduced to its minimum on account of the less resistance offered by the circuit of lead 62 to the flow of current to the battery circuit, so that the resistance of coil 22 to the outward sliding movement of the propeller head to a higher speed position is reduced to allow adjustment of the propeller blades to drive the generator at a proper speed to maintain a low constant generating rate, but as the battery is being charged the voltage will gradually be increased in the battery circuit so that the attractive force of the compound regulator voltage coil 63 will be gradually increased to operate the armature 67, less magnetic power of the coil 71 being required under these conditions for coaction with coil 63 to attract the armature 67 in order to break the circuit at points 68, 69 and as less amperage flow through coil 71 will be required in such operation to open breaking contact at 68, 69, the circuit including coil 22 will function to maintain the lower charging rate of the generator at the lower wind speeds and control the speed of the propeller more easily under the low wind speeds and pressures. As the voltage in the circuit increases, the propeller will be more readily and quickly responsive to a governing action by coil 22 for electrical governing operations until the battery is nearly fully charged, when, as the voltage coil 63 is heavily magnetized by the higher voltage to break the circuit at contacts 68 and 69 cause flow of current through the solenoid coil 22, to finish charging the battery at low charging rate during which the propeller will be controlled at a low speed by electrical means including coil 22 which will have a degree of attractive power to effect control of the propeller to operate at a most efficient running pitch at a low but constant propeller speed at low or high wind speeds.

It will be noted that I do not employ a shunt resistance to control the charging rate of the generator, which renders the generator ineffective at low wind speeds for generating current. In my system the generator will be efficiently operated at low and high wind velocities and the charging rate controlled when the generator has charged the storage circuit up to a certain high point with current produced mostly at low wind speeds, and will thereafter control the propeller speed to maintain always a lowered but effective charging rate no matter how low or how high the speed of the wind may be.

An unnecessary continuation of charging of an already fully charged battery is harmful, and a continued running of the generator on a fully charged battery results in a wearing out of parts without any advantages. So in order to automatically stop or start the windmill as required by the state of charge of the battery and the circuit demands, I employ novel electrical and mechanical means which I will now proceed to describe.

Assuming that the windmill is running and battery fully charged, the stopping action is as follows:

From the positive of the battery the wire 87 takes voltage to energize a coil 88 and from said coil through the adjustable resistance 89 and ground 90 back to the battery negative 86. When the voltage of the battery reaches its full charge condition, governed by previous adjustment of variable resistance 89, the magnetic force of coil 88 on its core 92 is increased to attract the spring released magnetic armature 93, closing the circuit at contact points 93' and 94, so that through the conductors 87 and 95 a certain amount of amperage flows from the positive of the battery through the armature 93, contacts 93' and 94 and heavy coil 96, which is energized to exert a stronger magnetic pull on armature 93 holding contact points 93' and 94 tight and preventing heating and sparking at said contact points, the current continuing its travel by wire 97 through solenoid coil 98 and by lead 99 to insulated electrical break and make contact switch 100 and through grounded switch member 101 back to battery negative 86. The current passing through the solenoid coil 98 magnetically attracts its armature 102, which is coupled at one end by a connecting rod 103 to a pivoted bell-crank lever 104 connected to the brake operating cable 26. Lever 104 is provided at its other end with a projection 105 adapted to be engaged by the hooked end 106 of a pivoted latch 107 movable between stops 108 and 109 and pivotally connected at its opposite end to a bowable spring 110, which in its upward and downward bending movements alternately makes and breaks the contacts 111' and 112' of two opposed switches 111 and 112. The latch member 107 is connected to the movable core 113 of a solenoid including coil 114, which when energized pulls said core 113 downwardly to move latch from an engaging position to its releasing position illustrated. The hooked end 106 of the latch 107 provides a locking projection 106' and a trip arm or projection 107'. The drawing shows the parts of the brake holding and releasing means in released position in which member 104 is drawn upward by the brake release spring 124. The latch 107 has been drawn down to release position and set for a latching action.

The member 104 is connected by means of contractible spring 124 to brake actuating cable 26. When the solenoid coil 98 is energized, the core 102 is drawn down and operates member 104 to pull down on parts 124 and 26 to apply the brake and stop the propeller. In this operation the latch arm of member 104 strikes projection 107' to move latch 107 against stop 109 and tilt member 107 to pull the core 113 upward bringing latch projection 106' above and in engagement with projection 105 to lock the brake in applied position and also bowing spring 110 downward which closes the contacts 111' of switch 111 and break the contacts 112' of switch 112, thus de-energizing coil 98 and preparing the circuit to energize coil 114 for starting operation when demanded by the circuit voltage conditions. As the spring 110 is held between the keeper notches of a fixed keeper 115 and a threaded and adjustable keeper screw 116 and locknut 117, said spring 110 when bowed downward or upwards will be tensioned to hold either switch in a switch-off position and acts incidentally as a detent to assist in holding member 107 either in locking or released position.

At the close of a stopping operation the contacts of switch 111 and 112 are respectively left engaged and disengaged by the action of spring 110 in preparation for an automatic starting operation, and the coil 98 is at the same time de-energized, but as the armature 93 is pulled down on a fully charged (high voltage) state of the battery, and, as the closing (voltage) coil 88 is always in circuit and remains energized more or less in proportion to the voltage value of the battery, any lowered voltage of the battery is sufficient to weaken the voltage coil 88 so that the magnetic tension of said coil 88 can no longer hold the armature 93 attracted against the pull of its spring 93'', whereby said armature is operated to disconnect current contacts 93', 94 and as switch members 111, 111' are connected, by connecting the armature 93 contact 118 to contact 119, the circuit to the coil 120 of a starting circuit will be completed. Current will then flow from battery positive through conductors 87 and 95 and armature 93 through contacts 118 and 119, and coil 120, energizing its core 121 to hold armature 93 upwardly and contacts 118, 119, firmly in connection to prevent sparking, the current passing from coil 120 through conductor 122 and coil 114 which is energized and attracts the solenoid armature 113 which swings latch member 107 to the left, thus releasing hook 106' from projection 105 whereby member 104 is rocked upwards by the tension of the brake springs 123 and 124 moving the solenoid core 102 upwards. In this action spring 110 is bent upwardly to engage the switch members 112, 112' for the next operation of stopping the windmill, also breaking the circuit at contacts of switch members 111, 111' in order to de-energize the entire starting circuit.

This system of controlling and operating the stopping and starting mechanism has the great advantage of preventing cycling of the battery, as, when, by any reason the voltage drops to a predetermined degree in the circuit, the windmill will be set into operation. For example, any medium or heavy drain of current demanded from the battery, as in the use of motors or any appliances that require medium or large amounts of current, will cause a voltage drop at the circuit and weaken the voltage coil 88, thus releasing armature 93 and energizing the starting circuit to instantly start the windmill to supply the current for the appliance or appliances switched into function. This prevents rapid depletion of the battery and adapts the battery to be kept in a fully charged state to supply the current demands for any purpose in calm periods of the wind. Another advantage is that in case of dirty or broken battery terminal connections the machine will be caused to instantly stop, discontinuing the charging process and preventing the burning of lights or any of the controlling apparatus in the circuit, as the resulting voltage in the coil 88 as in the circuit will be increased and establish a sudden stopping action.

The stopping coil 88 is normally active and magnetizing its core 92, but when the battery requires recharging and as the voltage is low the armature 93 will connect the contacts 118 and 119 causing the releasing of the brake to start the windmill and the generator action.

A switch 125 is provided for connecting a radio R or disconnecting it from the supply circuit. This switch is connected at 125' to cut in the radio. Assuming that the windmill is running, if any objectionable interference noise preventing clear audition occurs, the radio auditor may stop the windmill by simply changing the position of the switch from contact position 125' to contact position 125", causing current to be diverted and pass through a coil 126' from the battery lead 87. A certain magnetic power thus supplied and energizing core 92 in collaboration with the magnetizing action of voltage coil 88, will be sufficient to attract the armature 93, and engage stopping contacts 93', 94 to close the stopping circuit to stop the windmill and keep it stopped regardless of the state of charge of the battery, and to start the windmill as soon as the radio is switched off, as the coil 88 cannot hold the armature without the cooperation of coil 126', on account of the low voltage of the battery.

A manually-operable double-throw switch 126 (Figs. 6, 8, 9, 10) is provided in practice on the instrument board or panel of the apparatus for controlling the circuit to change the speed of the propeller and the charging rate of the generator. This switch is normally connected in series with the conductor 62 and comprises a pair of switch members 131, 132 connected for movement in unison by an insulated cross bar 132'. The portion of the conductor 62 with which this switch cooperates is broken to provide two branches 127, 127' normally connected by the switch member 131, as shown in Figs. 6 and 8, whereby the flow of current from the generator to the circuit may be normally controlled by the compound voltage and current regulator in the ways previously described. A by-pass conductor 72' is provided which is extended as a branch from the conductor 72, to which conductor 72' the switch member 132 is connected. The switch member 132 is normally idle and arranged between two contacts 129, 130 respectively connected with conductor branch 127 and conductor 85. The switch 126 may be moved to the left, as shown in Fig. 9, to disengage switch member 131 from engagement with contact 129 of branch conductor 127 and move it to open position and to engage switch member 132 with contact 129 of said branch conductor. The switch 126 may also be moved to the right, as shown in Fig. 10, to disengage switch member 131 from engagement with contact 129 of conductor branch 127 and move it to open position and to engage switch member 132 with contact 130 of conductor 85.

When the switch member 126 is moved from its normal position shown in Fig. 8 to its controlling position shown in Fig. 9 the flow of current through conductor 62, the coils 63, 71 and 86 of the compound voltage and current regulator in the normal ways previously described will be broken and the current from the generator will be diverted and caused to flow through switch member 132, conductor 72' and conductor 72 directly to and through the cut in and cut out relay to and through the battery and back to the generator negative. The compound voltage and current regulator will thus be rendered inactive and the generator will charge the battery at a high rate governed only by the speed of the propeller, which in turn will be governed in action only by its mechanical governing means. When the switch 126 is moved to the position shown in Fig. 10, the flow of current from the generator through the conductor 62 to the compound voltage and current regulator will be cut off and the generator current will be caused to pass through solenoid coil 22, conductor 85, switch member 132 and conductors 72' and 72 to the cut in and cut out relay and through the battery and back to generator negative. The current flowing in this manner forces the propeller to be electrically and mechanically governed at a low charging rate not affected by battery conditions or circuit demands.

To the positive pole of the battery is connected a lead 136 which by means of a push button switch 137 may be connected to the lead 62. Through this lead and the switch 137 the current from the battery positive may be passed through lead 62 to motorize the generator, from which through lead 80 the current will flow back to battery negative. When the windmill is thrown out of action, and the brake is applied to maintain the propeller in an inoperative state, the closing of switch 137 will cause the flow of current from the battery to the generator with the result of a voltage drop in the circuit and voltage coil 88, so that armature 93 will no longer be held by core 92 and will connect contacts 118 and 119 to operate the starting apparatus and release the brake in the manner hereinbefore described. This mode of releasing the brake and starting the propeller is effected almost instantly, and the propeller commences to run practically as soon as the push button switch 137 is pressed.

In order to enable a low voltage battery, such as a six or twelve volt battery, to be charged by a high voltage generator, such as a thirty-two volt generator, I provide a commutator switch 133 which is interposed between and normally connects two sections of conductor 72'.

This switch 133 is movable to disconnect the two sections of conductor 72' and to connect that section of the conductor leading thereto from the switch 126 with a conductor 134 which in practice will be connected with a suitable cut in and cut out relay and the positive pole of the six or twelve volt battery to be charged. When switch 133 is connected with conductor 134 and switch member 132 engaged with contact 129, as shown in Fig. 9, the automatic compound voltage and current regulator will be cut out of action and the low voltage battery may be charged through the conductor 134 and a cut in and cut out relay of the same voltage as the battery, the negative pole of which is suitably connected to the negative lead of the generator.

From the foregoing description, taken in connection with the drawings, the construction, mode of operation and advantages of my invention will be readily understood and appreciated by those versed in the art without a further and extended description. It is to be understood, of course, that while the construction disclosed herein is preferred, changes in the form, construction and arrangement of the parts, within the scope of the appended claims, may be made, and equivalents employed, without departing from the spirit or sacrificing any of the advantages of the invention.

Having thus described my invention, I claim:

1. A variable propeller comprising a stationary rear casing section, a rotary shaft journaled in and extending outwardly at one end beyond said rear casing section, a movable front casing enclosing the outwardly extending end of the shaft and section forming a hub rotatably connected with and slidable longitudinally on said outwardly extending end of the shaft, said front casing section having an open front portion and a detachable cover plate closing the same, blades mounted on the hub section for rotation therewith and adjustment about their axes to different pitch angles, interengaging gear connections enclosed within the hub section between the blades and shaft for adjusting the blades when the hub slides longitudinally, the hub and blades being slidable on the shaft toward the stationary rear casing section in response to wind thrusts acting on said hub and blades, a rotatable adjusting device carried by the cover plate in axial alignment with the shaft, a spring interposed between the same and the forward end of the shaft for yieldingly resisting the wind speed adjustments of the hub section, said adjusting device being adjustably mounted on the hub section and extending outwardly therefrom and arranged to bear on the spring for regulating the resistance of the spring and adjusting the hub section to vary the pitch angle of the blades, and means on the outer end of said adjusting device whereby it may be rotated for adjustment and fixed in adjusted position to the cover plate.

2. A variable propeller comprising a stationary head section, a rotary shaft journaled in and extending outwardly at one end beyond said head section, a movable head section forming a hub rotatably connected with and slidable longitudinally on said outwardly extending end of the shaft, blades mounted on the hub section for rotation therewith and adjustment about their axes to different pitch angles, interengaging gear connections between the blades and shaft for adjusting the blades when the hub slides longitudinally, the hub and blades being slidable on the shaft toward the stationary head section in response to wind thrusts acting on said hub and blades, resilient means interposed between and in abutting engagement with the shaft and hub section and operable on the hub section to yieldingly resist its wind speed adjustments toward the stationary head section, and electrical means for adjusting the hub section toward the stationary section including a solenoid arranged coaxially with the shaft between said sections and having its coil attached to one section and its armature attached to the other section.

3. A variable propeller comprising a stationary head section, a rotary shaft journaled in and extending outwardly at one end beyond said head section, a movable head section forming a hub rotatably connected with and slidable longitudinally on said outwardly extending end of the shaft, blades mounted on the hub section for rotation therewith and adjustment about their axes to different pitch angles, interengaging gear connections between the blades and shaft for adjusting the blades when the hub slides longitudinally, the hub and blades being slidable on the shaft toward the stationary head section in response to wind thrusts acting on said hub and blades, resilient means interposed between and in abutting engagement with the shaft and hub section and operable on the hub section to yieldingly resist its sliding wind speed adjustments toward the head section, and electrical means including a solenoid coil and armature members arranged about the shaft between the head and hub sections and respectively fixed thereto and adapted to be energized to slide the hub section toward the head section.

4. A variable propeller comprising a stationary head section, a rotary shaft journaled in and extending outwardly at one end beyond said head section, a movable head section forming a hub rotatably connected with and slidable longitudinally on said outwardly extending end of the shaft, blades mounted on the hub section for rotation therewith and adjustment about their axes to different pitch angles, interengaging gear conections between the blades and shaft for adjusting the blades when the hub slides longitudinally, the hub and blades being slidable on the shaft toward the stationary head section in response to wind thrusts acting on said hub and blades, resilient means interposed between and in abutting engagement with the shaft and hub section and operable on the hub section to yieldingly resist its wind sped adjustments toward the head section, and electrical means for adjusting the hub section toward the head section including a solenoid arranged about the shaft between the hub and head sections and comprising coil and armature members respectively fixed to the head and hub sections in telescopic relation to each other.

5. A variable propeller comprising a stationary rear casing section, a rotary shaft journaled in and extending outwardly at one end beyond the rear casing section, a front casing section forming a hub enclosing and rotatably connected with and slidable longitudinally on said outwardly extending end of the shaft, blades mounted on the hub section for rotation therewith and adjustment about their axes to different pitch angles, the hub and blades being slidable on the shaft toward the stationary head in response to wind thrusts acting on said hub and blades, a spring disposed at the forward end of the shaft and between the same and front wall of the hub section for yieldingly resisting the sliding movements of said hub section, adjusting means carried by the front wall of the hub section and extending therefrom and arranged to bear on the spring whereby the resistance of the spring to the sliding movements of the hub section may be varied, track rails within the hub section extending longitudinally at opposite sides thereof, gear pinions on the roots of the blades, and a driver fixed to the shaft and enclosed with the pinions in the hub section and having oppositely projecting radial arms slidably engaged at their outer ends with the track rails and provided at their inner ends with racks arranged thereon at angles of 90° to said arms and meshing with said gear pinions.

6. A windmill including in combination a stationary rear casing section, a rotary shaft journaled therein and extending forwardly therefrom, a front casing section enclosing the forwardly projecting portion of the shaft and forming a hub rotatable with and slidable longitudinally on the shaft, blades carried by and pivotally mounted on the front casing section so as to be axially adjustable to different pitch angles, track rails extending along the inner surfaces of the side walls of said inner casing section at opposite sides of the shaft, a driver bar enclosed in the front casing section and connected centrally of its length with the shaft and substantially in line with the pivotal axes of the blades and having arms projecting radially therefrom toward the track rails and slidably engaged at their outer ends with said track rails to form a direct driving connection between the hub section and shaft in any of the positions to which the hub section may be slidably adjusted, interengaging gear elements disposed within the hub section and respectively fixed to the arms of the bar and to the shafts of the blades for adjusting the blades, the hub being movable rearwardly in one direction from a normal position on the shaft under wind thrusts on the blades to adjust the blades to different pitch angles through the action of said gear elements, and resilient means interposed between the shaft and hub section for yieldingly resisting such movements of the hub and blades under relatively strong wind forces and moving the same backward toward their normal positions in the presence of relatively reduced wind forces.

7. A windmill including in combination a stationary rear casing section, a rotary shaft journaled therein and projecting forwardly therefrom, a movable front casing section forming a hub rotatable with and slidable longitudinally on the shaft toward and from the stationary rear section, blades having staffs pivotally mounted on the hub section so as to adapt the blades to be rotatably adjusted to different pitch angles, longitudinal track rails extending along the inner side of the walls of the hub section at opposite sides of the shaft, a driver bar enclosed within the hub section and connected centrally of its length with the shaft substantially in radial alinement with the pivotal axes of the blades and having arms projecting therefrom toward and slidably engaged at their outer ends with said track rails to form a direct driving connection between the hub and shaft in any of the posiions to which the hub may be slidably adjusted, interengaging gear elements within the hub section comprising pinions on the blade staffs and gear racks at the inner ends of the driving bar for adjusting the blades, the hub being movable rearwardly from a normal position on the shaft under wind thrusts on the blades to adjust the blades to different pitch angles through the action of said gear elements, a spring interposed between the shaft and hub section for yieldingly resisting such movements of the hub, and a coil spring connecting each blade with the hub and acting on the blade for resisting its adjustment, the first named spring and said springs connected to the blades serving to conjointly resist such movement of the hub and adjustment of the blades in the presence of relatively strong wind forces and to move the same backward toward their normal positions in the presence of relatively reduced wind forces.

8. A windmill including in combination a stationary front casing section, a rotary shaft journaled therein and projecting forwardly therefrom, a movable front casing section forming a hub enclosing the forwardly projecting end of the shaft and rotatable with and slidable longitudinally on the shaft toward and from the stationary rear casing section, radially arranged blades having staffs pivotally mounted on the hub so as to adapt the blades to be axially adjusted to different pitch angles, track rails extending parallel with the shaft along the inner sides of the walls of the hub at opposite sides of the shaft, a driver bar within the hub section connected centrally of its length with the shaft substantially in radial alinement with the pivotal axes of the blades and having arms projecting therefrom and slidably engaged at their outer free ends with said track rails to form a direct driving connection between the hub and shaft in any of the positions to which the hub may be slidably adjusted, gear elements enclosed within the hub and comprising pinions on the blade staffs and rack bars fixed to the inner ends of the arms of the driver bar for engagement with the pinions to adjust the blades, the hub being movable rearwardly on the shaft from a normal position on the shaft toward the rear casing section under wind thrusts on the blades to adjust the blades to different pitch angles through the action of said gear elements, and resilient means interposed between the shaft and hub for yieldingly resisting such movements of the hub and blades under relatively strong wind forces and moving the same backward toward their normal positions in the presence of relatively reduced wind forces.

9. A windmill including in combination a stationary rear casing section, a rotary shaft journaled therein and extending forwardly therefrom, a movable front casing section forming a hub enclosing and rotatable with and slidable longitudinally on the forwardly projecting end of the shaft, blades carried by and pivotally mounted on the hub for adjustment to different pitch angles, track rails extending along the walls of the hub at opposite sides of and parallel with the shaft, a driver bar within the hub connected centrally of its length with the shaft and having arms projecting therefrom toward and slidably engaged at their outer free ends with said track rails to form a direct driving connection between the hub and shaft in any of the positions to which the hub may be slidably adjusted, interengaging gear elements on the arms of the bar and roots of the blades for adjusting the blades, the hub being movable to different degrees rearwardly from a normal primary position on the shaft under wind thrusts on the blades to adjust the blades from a normal pitch angle to different pitch angles through the action of said gear elements, resilient means interposed between the shaft and hub for yieldingly resisting such movements of the hub and blades under relatively strong wind forces and moving the same backward toward their normal positions in the presence of relatively reduced wind forces, and electrical means for sliding the hub rearwardly to an arbitrary position, said electrical means comprising a solenoid disposed between said casing sections and having its coil attached to one section and its armature attached to the other section.

10. A windmill including in combination a stationary rear casing section, a rotary shaft carried thereby and projecting forwardly therefrom, a movable front casing section forming a hub rotatable with and slidable longitudinally on the forwardly projecting portion of the shaft, said hub having an access opening at the front thereof, blades having staffs pivotally mounted on the hub for adjustment of the blades to different pitch angles, longitudinal track rails on the hub located interiorly of the hub at opposite sides of the shaft, a driver bar disposed within the hub and connected centrally of its length with the shaft in alinement with the blade staffs and having arms projecting therefrom radially toward the track rails and slidably engaging said track rails at their outer ends to form a direct driving connection between the hub and shaft in any of the positions to which the hub may be slidably adjusted, interengaging gear elements respectively connected to the arms of the bar and staffs of the blades for adjusting the blades, the hub being movable rearwardly from a normal position on the shaft under wind thrusts on the blades to adjust the blades to different pitch angles through the action of said gear elements, a detachable cover plate closing the opening in the hub section, through which opening the parts disposed in the hub section are accessible when the cover plate is removed, an adjusting device mounted on the cover plate and projecting outwardly therefrom, and a spring disposed between the cover plate and forward end of the shaft for yieldingly resisting such movements of the hub and blades under relatively strong wind forces and moving the same backward toward normal position in the presence of relatively reduced wind forces, said spring being adjustable to vary its resistance to the movements of the hub and blades under the wind forces by means of said adjusting device.

11. A windmill including in combination a stationary rear casing section, a rotary shaft carried thereby and projecting forwardly therefrom, a movable front casing section forming a hub enclosing and rotatable with and slidable longitudinally on the forwardly projecting portion of the shaft, blades carried by the hub and rotatably adjustable to different pitch angles, track rails carried by and disposed within the hub at opposite sides of the shaft, a driver bar enclosed within the hub and connected centrally of its length with the shaft and having arms projecting therefrom and slidably engaged at their outer ends with said track rails to form a direct driving connection between the hub and shaft in any of the positions to which the hub may be slidably adjusted, interengaging gear elements on the bar and blades for adjusting the blades, the hub being movable in one direction from a normal position on the shaft under wind thrusts on the blades to adjust the blades to different pitch angles through said gear elements, means comprising a spring arranged between the hub and shaft and a spring connecting each blade with the hub for yieldingly resisting such movements of the hub and resultant adjustments of the blades under relatively strong wind forces and moving the same backward toward their normal positions in the presence of relatively reduced wind forces, and means mounted on the hub and engaging the first named spring for regulating the resistance of said first-named spring to the sliding movements of the hub under wind pressures.

12. A windmill including in combination a stationary front casing section a rotary shaft carried thereby and projecting forwardly therefrom, a movable front casing section forming a hub rotatable with and slidable longitudinally on the shaft toward and from the stationary casing section, blades carried by and pivotally mounted on the hub for adjustment to different working pitch angles, a transmission connection disposed in the hub between the hub, the shaft and the blades for driving the shaft from the hub and adjusting the blades when the hub slides on the shaft, the hub being slidable rearwardly from a primary normal forward position on the shaft to other positions on the shaft under wind thrusts on the blades to adjust the blades from a primary pitch angle to different working pitch angles through the action of said transmission connection, resilient means interposed between the shaft and hub and acting on the latter to yieldingly resist such movements of the hub and blades under relatively strong wind forces and moving the same backward toward their normal positions in the presence of relatively reduced wind forces, and electrical means operable independently of wind forces for sliding the hub rearwardly to a predetermined position to adjust the blades to a still different working pitch angle, said electrical means including coacting members interposed between and mounted respectively on the stationary casing section and hub and energizable to so slide the latter.

13. A windmill including in combination a stationary rear casing section, a rotary shaft carried thereby and projecting forwardly therefrom, a movable front casing section forming a hub rotatable with and slidable longitudinally on the forwardly projecting portion of the shaft toward and from the stationary casing section, blades carried by and pivotally mounted on the hub for adjustment to different working pitch angles, a transmission connection disposed in the hub between the hub, the shaft and the roots of the blades for driving the shaft from the hub and adjusting the blades when the hub slides on the shaft, the hub being slidable rearwardly on the shaft to different degrees from a normal position under wind thrusts on the blades to adjust the blades from a primary pitch angle to other pitch angles through the action of said transmission connection, resilient means interposed between the shaft and hub for yieldingly resisting such movements of the hub and blades under relatively strong wind forces and moving the same backward toward their normal position in the presence of relatively reduced wind forces, and electrical means disposed between the casing sections for arbitrarily sliding the hub rearwardly independent of any acting wind force to a predetermined position on the shaft and adjusting the blades to a predetermined pitch angle, said electrical means including a magnetic core carried by the stationary casing section and a magnetic coil carried by the hub section and rotatable and slidable with the latter and with relation to the coil, said coil being energizable to attract the core.

CHARLES FUMAGALLI.

REFERENCES CITED

The following references are of record in the file of this patent:

UNITED STATES PATENTS

| Number | Name | Date |
|---|---|---|
| 723,988 | Church | Mar. 31, 1903 |
| 1,114,759 | Heyroth | Oct. 27, 1914 |
| 1,125,783 | Waters | Jan. 19, 1915 |
| 1,131,434 | Snee et al. | Mar. 9, 1915 |
| 1,165,418 | Kerr | Dec. 28, 1915 |
| 1,362,753 | Sperry | Dec. 21, 1920 |
| 1,874,461 | Lambert | Aug. 30, 1932 |
| 2,159,886 | Cullin | May 23, 1939 |
| 2,179,885 | Fumagalli | Nov. 14, 1939 |
| 2,360,792 | Putnam | Oct. 17, 1944 |
| 2,363,850 | Bany | Nov. 28, 1944 |
| 2,370,135 | Berliner | Feb. 27, 1945 |
| 2,426,007 | Forsyth | Aug. 19, 1947 |
| 2,515,607 | Miller | July 18, 1950 |

FOREIGN PATENTS

| Number | Country | Date |
|---|---|---|
| 878,461 | France | Oct. 12, 1942 |
| 878,544 | France | Oct. 19, 1942 |